US007951481B2

(12) United States Patent
Ishioka et al.

(10) Patent No.: US 7,951,481 B2
(45) Date of Patent: May 31, 2011

(54) SEPARATOR AND CELL USING THE SAME FOR USE IN SOLID POLYMER ELECTROLYTE FUEL CELL

(75) Inventors: Yutaka Ishioka, Nagoya (JP); Yasuhiko Mihara, Nagoya (JP); Ryo Hirai, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 991 days.

(21) Appl. No.: 11/188,804

(22) Filed: Jul. 26, 2005

(65) Prior Publication Data
US 2007/0031719 A1 Feb. 8, 2007

(30) Foreign Application Priority Data
Jul. 29, 2004 (JP) .................... 2004-221650

(51) Int. Cl.
*H01M 8/02* (2006.01)
*H01M 8/04* (2006.01)
*H01M 8/24* (2006.01)

(52) U.S. Cl. .................. 429/129; 429/457; 429/463
(58) Field of Classification Search .............. None
See application file for complete search history.

(56) References Cited

U.S. PATENT DOCUMENTS

| 4,194,059 A | 3/1980 | Durand |
| 4,514,475 A * | 4/1985 | Mientek ............ 429/35 |
| 4,973,412 A * | 11/1990 | Migdal et al. ............ 508/192 |
| 6,316,139 B1 | 11/2001 | Uchida et al. |
| 6,440,597 B1 | 8/2002 | Mizuno |
| 6,451,469 B1 | 9/2002 | Nakamura et al. |
| 7,014,939 B2 | 3/2006 | Suenaga et al. |
| 2002/0086196 A1 | 7/2002 | Utsunomiya et al. |
| 2002/0102453 A1* | 8/2002 | Suenaga et al. ............ 429/37 |
| 2002/0117780 A1 | 8/2002 | Inoue et al. |
| 2003/0003343 A1* | 1/2003 | Cisar et al. ............ 429/36 |
| 2004/0033412 A1* | 2/2004 | Enjoji et al. ............ 429/34 |
| 2004/0038102 A1 | 2/2004 | Beckmann et al. |
| 2005/0031936 A1* | 2/2005 | Joos ............ 429/38 |
| 2005/0106444 A1* | 5/2005 | Yamauchi et al. ............ 429/35 |

FOREIGN PATENT DOCUMENTS

| JP | A-2002-083610 | 3/2002 |
| JP | A-2004-47495 | 2/2004 |
| JP | A-2004-146384 | 5/2004 |
| JP | 2004-207074 | 7/2004 |

* cited by examiner

*Primary Examiner* — Ula C. Ruddock
*Assistant Examiner* — Alix Echelmeyer
(74) *Attorney, Agent, or Firm* — Oliff & Berridge, PLC (57) ABSTRACT

A separator for use in a solid polymer electrolyte fuel cell, including a membrane/electrode assembly including a fuel electrode and an oxidant electrode disposed on either side of a solid polymer electrolyte membrane; a first separator superposed against a surface of the oxidant electrode forming an oxidant gas flow passage; and a second separator superposed against a surface of the fuel electrode forming a fuel gas flow passage. The first separator and the second separator are composed of rectangular thin metal plates, with outer peripheral edges of the first separator and the second separator each bending inclined towards a secondary face thereof on an opposite side of a primary face thereof that is superposed against the membrane/electrode assembly, thereby integrally forming a reinforcing rib.

9 Claims, 7 Drawing Sheets

SEPARATOR AND CELL USING THE SAME FOR USE IN SOLID POLYMER ELECTROLYTE FUEL CELL

INCORPORATED BY REFERENCE

The disclosure of Japanese Patent Application No. 2004-221650 filed on Jul. 29, 2004 including the specification, drawings and abstract is incorporated herein by reference in its entirety.

BACKGROUND OF THE INVENTION

1. Field of the Invention

The present invention relates in general to a cell for use in a solid polymer electrolyte fuel cell that employs a solid polymer electrolyte membrane, and more particular to a cell for a solid polymer electrolyte fuel cell of novel construction that affords a high level of gas flow path sealing functionality within the cell by means of a simple construction.

2. Description of the Related Art

As is well known, solid polymer electrolyte fuel cells are able to produce electrical power by means of an electrochemical reaction when supplied with oxygen (air) as an oxidant and hydrogen as a fuel, these being supplied onto the surfaces of a pair of catalyst electrodes superposed against either face of an electrolyte which is a solid polymer electrolyte membrane, such as a solid ion exchange membrane or the like.

In solid polymer electrolyte fuel batteries, it is important that there be consistent supply of oxygen and hydrogen onto the surfaces of the catalyst electrodes in order to consistently and efficient produce the intended voltage. It is also important for the appropriate temperature to be maintained.

Accordingly, there is typically employed a cell of a structure wherein a membrane/electrode assembly (MEA) composed of a breathable porous membrane oxidant electrode and a fuel electrode disposed on either side of the solid polymer electrolyte membrane is assembled with a first separator superposed against the oxidant electrode face thereof and a second separator superposed against the fuel electrode face thereof. A plurality of such unit cells are stacked and electrically connected directly to produce the desired voltage.

An oxidant gas flow passage is formed by means of covering with the oxidant electrode a recess disposed on the first separator, and fuel gas flow passage is formed by means of covering with the fuel electrode a recess disposed on the second separator. A coolant flow passage is formed by a recess disposed in a secondary face of the first separator or second separator on the back side from a primary face which is superposed against the electrode, by covering the recess with the secondary face of another adjacent cell.

At respective peripheral edges of stacked unit cells, there are formed perforating therethrough in the stacking direction an oxidant gas inlet and an oxidant gas outlet, a fuel gas inlet and a fuel gas outlet, and a coolant inlet and a coolant outlet. Oxidant gas, fuel gas, and coolant supplied through these inlets and outlets are circulated the aforementioned oxidant gas flow passages, fuel gas flow passages, and coolant flow passages of the unit cells, and are discharged from the outlets (as taught in JP-A-2002-83610, for example).

In such a solid polymer electrolyte fuel cell, since the power generating capability of a single unit cell is low, on the order to 0.7 V, there is employed a construction in which a multitude of cells are stacked together and electrically connected directly in order to obtain the desired power generating capability. However, there it the problem that when large numbers of cells are stacked, the overall size of the fuel cell becomes rather large.

In order to reduce overall size a fuel cell, it would be conceivable to make thinner the first and second separators, whose dimensional limitations in terms of performance are less than those of the membrane/electrode assembly. However, where the first and second separators are made thinner, rigidity of the components is lower, and thus during transport subsequent to manufacture or during assembly, there is a risk that the separators may become deformed. If a separator becomes deformed, in the assembled cell there is an attendant risk of diminished sealing of the gas flow zone formed between the juxtaposed faces of the membrane/electrode assembly and the separator, creating the possibility of diminished performance and reliability.

In recent years in particular, there has been a trend towards using higher gas pressure levels within flow passages, for the purpose of rapidly expelling the water that forms within the gas flow passages to prevent it from collecting, as well as making the electrochemical reaction more efficient. Thus, it is recognized that it is extremely important to ensure separator rigidity. Accordingly, it was very difficult to design a more compact fuel cell by means of reducing separator thickness.

SUMMARY OF THE INVENTION

It is therefore one object of the present invention to provide a separator for a solid polymer electrolyte fuel cell of novel construction, whereby the separator can be made thinner while ensuring component rigidity to consistently ensure sealing in the gas flow zone, whereby a more compact fuel cell may be advantageously achieved.

For the following eight mode of the invention in particular, it is also an object to provide cell for a solid polymer electrolyte fuel cell of novel construction, whereby a fuel cell of compact size may be achieved, while ensuring adequate sealing in the gas flow zone formed therein.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a separator for a solid polymer electrolyte fuel cell, comprising: a membrane/electrode assembly including a fuel electrode and an oxidant electrode disposed on either side of a solid polymer electrolyte membrane; a first separator superposed against a surface of the oxidant electrode forming an oxidant gas flow passage; and a second separator superposed against a surface of the fuel electrode forming a fuel gas flow passage, wherein the first separator and the second separator are composed of rectangular thin metal plates, with outer peripheral edges of the first separator and the second separator each bending inclined towards a secondary face thereof on an opposite side of a primary face thereof that is superposed against the membrane/electrode assembly, thereby integrally forming a reinforcing rib.

With the solid polymer electrolyte fuel cell separator of construction according to this embodiment, by fabricating the first separator and the second separator of metal, higher strength can be assured as compared to a separator using carbon or the like, and thus the required strength can be assured while making the first and second separators sufficiently thin. Additionally, the metal separator has better conductivity than a separator using carbon or the like. Thus, it is possible to achieve a more compact, high performance fuel cell, while ensuring adequate strength.

Additionally, the metal separator has much higher heat resistance temperature than resin or carbon, so that problems such as heat induced deformation and shrinkage can be avoided.

Additionally, the use of metal facilitates reuse by recycling or the like.

Further, the reinforcing rib is integrally formed by means of sloping and bending the outer peripheral edges of the first separator and the second separator. Thus, strength of the first separator and the second separator can be more advantageously achieved.

Additionally, by forming the reinforcing rib so as to slope towards the side of each separator opposite from the membrane/electrode assembly, the projecting height dimension of the reinforcing rib can be advantageously assured, while providing effective reinforcing effect.

Specifically, the thickness dimension of the membrane/electrode assembly is extremely thin, on the order of 500 μm, and the first separator and second separator are superposed directly against either side of the membrane/electrode assembly. However, on the secondary face on the side opposite the face for superposition against the membrane/electrode assembly, there are formed on the surface of the membrane/electrode assembly a fuel gas flow passage and an oxidant gas flow passage. In order to form a coolant flow passage between the opposed faces of the two separators, a gap dimension, typically of 1 mm or more, is formed. Naturally, in cases where a medial plate is interposed between front and back of the two separators, but also in cases where the separators are superposed directly front to back, a gap dimension of about 1.5-2.0 mm is formed between the front and back of the two separators.

In the present invention, focusing upon the special construction of such a cell for a fuel cell, the outer peripheral edges of the two separators are each bent towards the opposite side from the membrane/electrode assembly to form a reinforcing rib, whereby there is realized an embodiment making it possible to achieve, with sufficient reinforcing rib dimensions, reinforcement of the outer peripheral edges of the separators that is extremely effective in terms of construction of the separators when fastened at their outer peripheral portions in the stacking direction.

A second mode of the invention provides a separator for a solid polymer electrolyte fuel cell according to the aforesaid first mode, wherein the first separator and the second separator are each perforated in a thickness direction thereof by a total of six inlet/outlet holes, i.e., a fuel gas inlet hole, a fuel gas outlet hole, an oxidant gas inlet hole, an oxidant gas outlet hole, a coolant inlet hole, and a coolant outlet hole, the six inlet/outlet holes being established at locations corresponding to one another when the first separator and the second separator are flipped front to back, whereby the first separator and the second separator are formed from metal plates press formed with identical molds.

With the solid polymer electrolyte fuel cell separator of construction according to this embodiment, identical separators can be employed for superposition against either the oxygen electrode or the fuel electrode of the membrane/electrode assembly. Accordingly, the separator manufacturing equipment can be simplified. Additionally, management of separator stacking quantity, management of quantities in transit, and management of quantities at the assembly plant may be simplified appreciably.

Placement of the six inlet/outlet holes is common to both the first separator and the second separator when flipped front to back. Preferably, where the first separator is viewed from the primary face side, the fuel gas inlet hole and the fuel gas outlet hole will be formed at opposition locations in a first diagonal direction, and the oxidant gas inlet hole and oxidant fuel gas outlet hole will be formed at opposition locations in the other diagonal direction. Here, since the second separator is used flipped front to back, when viewed from the primary face side, the oxidant gas inlet hole and oxidant fuel gas outlet hole will be formed at opposition locations in a first diagonal direction, and the fuel gas inlet hole and the fuel gas outlet hole will be formed at opposition locations in the other diagonal direction. Accordingly, where a recess is formed connecting the fuel gas inlet hole/fuel gas outlet hole pair situated in a first diagonal direction, this can be utilized as a recess for forming the fuel gas flow passage. On the other hand, on the second separator, this can be used as a recess for forming the oxidant gas flow passage. Thus, it is possible to construct both the first separator and the second separator, including the recess for forming the flow passage, using metal separators of identical shape.

A third mode of the invention provides a separator for a solid polymer electrolyte fuel cell according to the aforesaid first or second mode, wherein each of the first separator and the second separator has generally rectangular cutout portions formed in four corners thereof, with the reinforcing rib being substantially divided from one another and formed independently by means of the cutout portions at the four corners.

With the solid polymer electrolyte fuel cell separator of construction according to this embodiment, strain created by forming the reinforcing rib can be substantially completely avoided, whereby durability can be improved, and mass production with excellent dimensional stability becomes possible.

Specifically, where the reinforcing rib formed along the four sides of the separator composed of a thin rectangular metal plate extends continuously around the entire periphery, there is appreciable strain in the corners of the separator, and residual stress tends to occur. In particular, as the separator is very thin, stress based on such strain poses a risk of unpredictable splitting or strain on the separator. In this embodiment, cutout portions at which material is removed in a rectangular shape are formed at the four corners of the separator, whereby the occurrence of such strain can be avoided.

A fourth mode of the invention provides a separator for a solid polymer electrolyte fuel cell according to any one of the first through third modes, wherein outer peripheral edge portions of the first separator and the second separator where the reinforcing ribs are formed have auxiliary seal rubbers attached extending in the peripheral direction, the auxiliary seal rubbers being disposed abutting one another between the superposed first separator and second separator so as to seal off from an outside space a zone between opposed faces of the first and second separators where the membrane/electrode assembly is disposed.

With the solid polymer electrolyte fuel cell separator of construction according to this mode, the space between the opposed faces of the separators is sealed off from the outside space by the auxiliary seal rubbers, whereby leakage of gas to the outside may be prevented more effectively, as well as maintaining therein a substantially stable environment in terms of gas components and temperature. Thus, durability can be improved, and it becomes possible to achieve consistent characteristics and performance.

Additionally, since reinforcing ribs of bent shape are embedded in the interiors of the auxiliary seal rubbers, a high level of attachment strength is advantageously assured. Preferably, the auxiliary seal rubbers will be vulcanization bonded to the separators.

A fifth mode of the invention provides a separator for a solid polymer electrolyte fuel cell according to any one of the first through fourth modes, wherein a primary face seal rubber layer is formed on the primary face of each of the first separator and the second separator, so as to surround a perimeter of a zone forming the fuel gas flow passage or the oxidant gas flow passage when superposed against the fuel electrode or oxidant electrode of the membrane/electrode assembly, and perimeters of the fuel gas inlet/outlet holes and the oxidant gas inlet/outlet holes for supplying and exhausting fuel gas and oxidant gas to and from the fuel gas flow passage and the oxidant gas flow passage.

With the solid polymer electrolyte fuel cell separator of construction according to this embodiment, zones where flow passages for each gas are formed can be sealed. Thus, leaking of fuel gas/oxidant gas within the fuel gas flow passage/oxidant gas flow passage to the oxidant gas flow passage/fuel gas flow passage can be prevented, advantageously achieving improved durability and consistent performance.

Additionally, by employing a metal separator, the primary face seal rubber layer can be securely and reliably formed covering the separator by means of vulcanization bonding of the primary face seal rubber layer.

In preferred practice, through combination with the fourth embodiment of the invention in particular, it is possible to readily achieve a high level of sealing by means of a double sealing mechanism, and to more advantageously produce the advantages of improved durability as well as consistent characteristics and performance.

A sixth mode of the invention provides a separator for a solid polymer electrolyte fuel cell according to any one of the first through fifth modes, wherein the auxiliary sealing rubber formed at the outer peripheral portion of one of the first separator and the second separator is superimposed against the auxiliary sealing rubber of another separator disposed in superposition therewith at corresponding sloping faces thereof so that by means of superposition of these sloping faces against one another, the mutually superposed first separator and second separator, by means of the auxiliary sealing rubber, can be aligned with respect to one another in a superposed plane direction orthogonal to a superposed direction.

With the solid polymer electrolyte fuel cell separator of construction according to this embodiment, the first separator and the second separator superposed against one another can be aligned with one another in the superposed plane direction orthogonal to the superposed direction, by means of the auxiliary sealing rubber. Thus, the first separator and second separator assembly operation can be carried out efficiently.

A seventh mode of the invention provides a separator for a solid polymer electrolyte fuel cell according to the aforesaid sixth modes, wherein the sloping face of the auxiliary sealing rubber is a lubricated face with improved lubricating function.

With the solid polymer electrolyte fuel cell separator of construction according to this mode, by making the sloping face of the auxiliary sealing rubber a lubricated face, the sloping face of the auxiliary sealing rubber can be imparted with a guide function in addition to its positioning function, whereby it is possible by means of the auxiliary sealing rubber to more efficiently carry out positioning of the first separator and the second separator juxtaposed against one another.

As the means for making the sloping face of the auxiliary sealing rubber a lubricated face, it would be conceivable by way of specific examples to employ as the material for the auxiliary seal rubber a known art self-lubricating rubber that incorporates oil or the like mixed into the rubber material so that lubricant bleeds onto the surface; to subject the molded auxiliary sealing rubber to irradiation with laser light or to a low-friction process; to coat it with a fluororesin or other low-friction resin; or to employ any of various other technologies known in the art.

A eighth mode of the invention relates to a cell for a solid polymer electrolyte fuel cell, and provides a cell for a solid polymer electrolyte fuel cell, wherein the first and second separators taught in any of the aforesaid first through seventh modes are used superposed from either side against the membrane/electrode assembly composed of a fuel electrode and an oxidant electrode disposed on either side of a solid polymer electrolyte membrane, forming a fuel gas flow passage between the opposed faces of the fuel electrode and the first separator, as well as forming an oxidant gas flow passage between the opposed faces of the oxidant electrode and the second separator.

With the cell for the solid polymer electrolyte fuel cell of construction according to this mode, by utilizing a metal separator comprising a special construction such as a reinforcing rib, it is possible to produce a more compact cell, while ensuring high levels of rigidity and electrical performance.

As will be apparent from the preceding description, in the solid polymer electrolyte fuel cell separator of construction according to the present invention, the outer peripheral edges of the first separator and the second separator are bent to slope towards the secondary face side, to integrally form a reinforcing rib, whereby sufficient reinforcing rib projection length can be assured, and separator rigidity can be advantageously improved. In particular, by forming the reinforcing rib at the outer peripheral edge of the separator, it is possible to increase appreciably the rigidity of the outer peripheral edge of the separator which is subjected to strong forces such as tightening force by bolts in the assembled state, or the like. Additionally, by making the separator of metal, it is possible to ensure strength while making the separator sufficiently thin, as well as to ensure a high level of electrical performance, due to the excellent conductivity of the material.

For the reasons cited above, the cell for the solid polymer electrolyte fuel cell of construction according to the present invention is able to make the cell for the solid polymer electrolyte fuel cell compact in size while assuring high rigidity and a high level of electrical performance.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
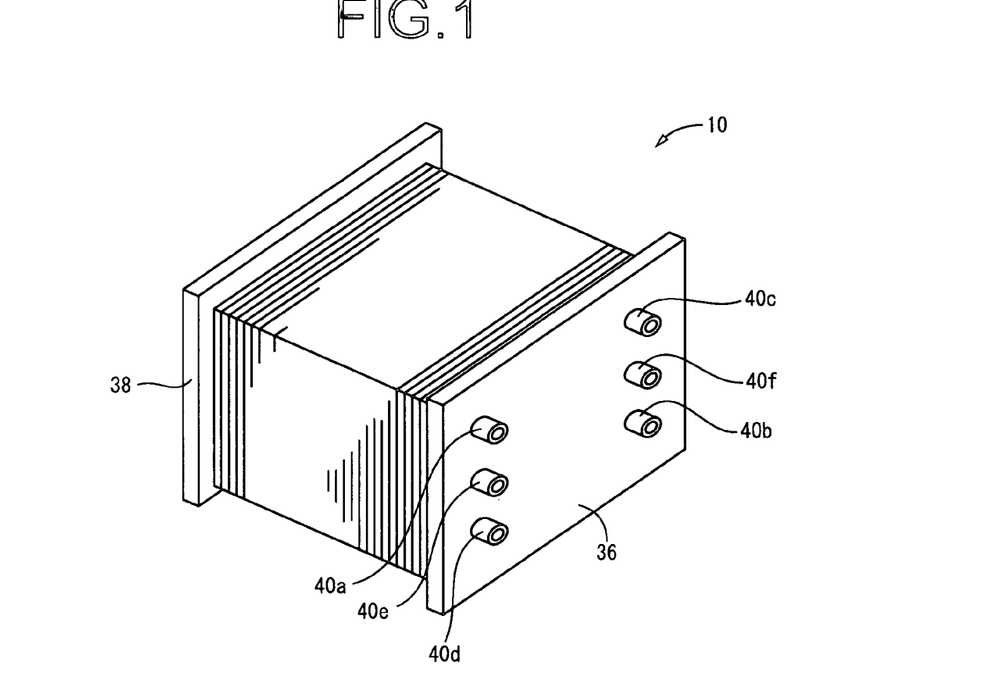
FIG. 1 is a perspective view of a solid polymer electrolyte fuel cell composed of separators of construction according to a first embodiment of the present invention.

A simplified perspective view of a solid polymer electrolyte fuel cell (PEFC) 10 composed of a stack of multiple unit cells 12 constructed according to the invention is depicted in FIG. 1. The solid polymer electrolyte fuel cell 10 depicted in FIG. 1 is arranged with the vertical and sideways directions in the illustrated state aligned with the plumb-bob vertical and horizontal directions. In the description hereinabove, as a general rule, the vertical and sideways directions, and plumb-bob vertical and horizontal directions, refer to those in the state illustration in FIG. 1.

Figure 2:
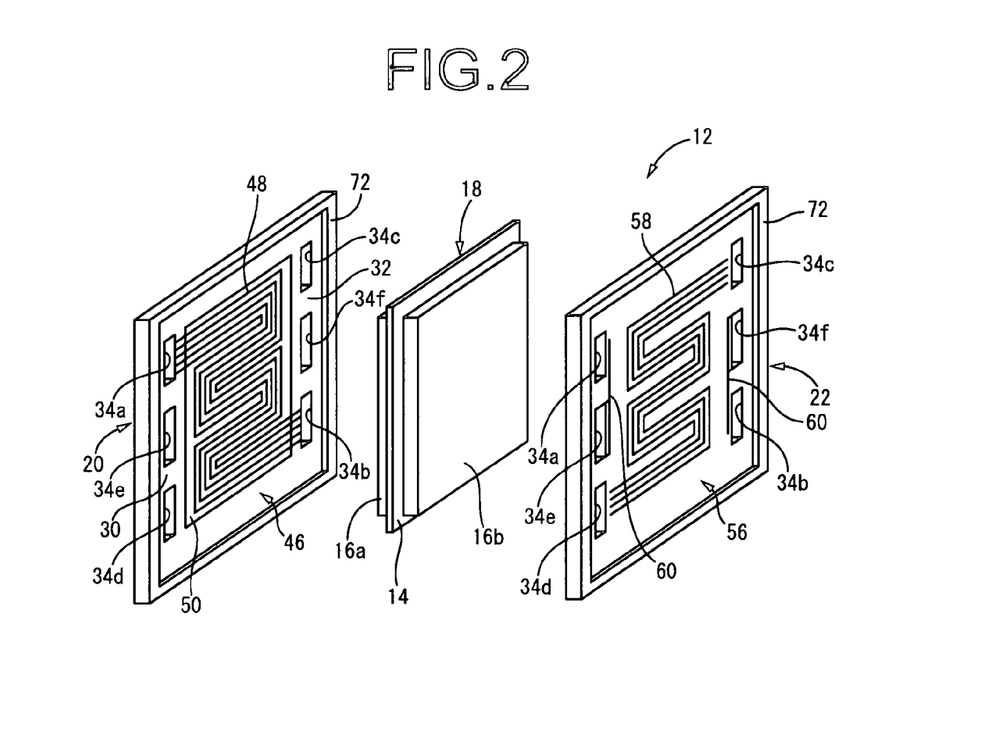
FIG. 2 is an exploded perspective view showing a construction of a unit cell of the solid polymer electrolyte fuel cell of FIG. 1.

More specifically, as shown in FIG. 2, the unit cells 12 making up the solid polymer electrolyte fuel cell 10 comprise a membrane/electrode assembly (MEA) 18 having as the electrolyte a solid polymer membrane 14 as a solid polymer electrolyte membrane such as a solid ion exchange membrane with a fuel electrode 16a and an oxidant electrode 16b as a pair of catalyst electrodes superposed to either side thereof and joined and unified therewith. A first separator 20 and a second separator 22 are superposed to either side of this membrane/electrode assembly 18 in a sandwich configuration. By stacking a plurality of unit cells 12 in the thickness direction, there is composed a cell stack that constitutes the main body of the solid polymer electrolyte fuel cell 10.

According to the known art, the fuel electrode 16a and an oxidant electrode 16b contain a platinum catalyst, and are formed, for example, from carbon or other conductive material, with a porous structure so as to permit gas to pass through. However, inclusive of the material of the solid polymer membrane 14, the material and microzone structure of the membrane/electrode assembly (MEA) 18 composed including the fuel electrode 16a and an oxidant electrode 16b are not characteristic features of the invention, but may be produced through application of known art technology, and as such will not be described in detail.

In each unit cell 12, a fuel gas flow passage 23 for supplying fuel (hydrogen) is formed at the superposed faces of the membrane/electrode assembly 18 and the first separator 20. An oxidant gas flow passage 26 for supplying air (oxygen) is formed at the opposed faces of the membrane/electrode assembly 18 and the second separator 22. Between two adjacent unit cells 12 which by being stacked together make up the cell stack, at the opposed faces of the first separator 20 of one unit cell 12 and the second separator 22 of the other unit cell 12, is formed a coolant flow passage 28 for circulating coolant.

Additionally, in each unit cell 12, a fuel gas inlet 34a, a fuel gas outlet 34b, an oxidant gas inlet 34c, and an oxidant gas outlet 34d are situated at the tops and bottoms of a first side edge 30 and a second side edge 32 located in opposition in the horizontal direction when installed in the solid polymer electrolyte fuel cell 10, each of these apertures being formed perforating in the stacking direction. In particular, the fuel gas inlet 34a and the fuel gas outlet 34b are formed at generally opposing locations along one diagonal, and the oxidant gas inlet 34c and the oxidant gas outlet 34d are formed at generally opposing locations along the other diagonal.

In the approximately center portion of the first side edge 30 and the second side edge 32 in each unit cell 12 are respectively formed, at opposing locations in the horizontal direction, a coolant inlet 34e and a coolant outlet 34f that pass through in the stacking direction.

In each unit cell 12, the membrane/electrode assembly 18 is of rectangular plate shape slightly smaller than the first and second separators 20, 22.

By so doing, the fuel gas, oxidant gas, and coolant inlets and outlets 34a-34f are formed as through-holes at corresponding locations in the first and second separators 20, 22, at locations away from an outer peripheral side of the membrane/electrode assembly 18. In the solid polymer electrolyte fuel cell 10, the plurality of stacked unit cells 12 communicate with one another, with the fuel gas, oxidant gas, and coolant inlets and outlets 34a-34f formed with an overall configuration passing in the stacking direction through the cell stack that makes up the main body of the solid polymer electrolyte fuel cell 10.

While not explicitly shown in the drawings, as taught for example in JP-A-2002-83610, of the plurality of stacked unit cells 12 in the solid polymer electrolyte fuel cell 10, the first separator 20 of the unit cell 12 situated at a first end in the stacking direction and the second separator 22 of the unit cell 12 situated at the other end in the stacking direction have an anode collector and a cathode collector superposed thereon. The total power of the plurality of directly connected unit cells 12 is drawn out from these collectors. Additionally, against the outside faces of the anode collector and cathode collector are superposed, via appropriate insulating spacers (not shown) an anode retainer plate 36 and a cathode retainer plate 38. Also, while not explicitly shown in the drawings, the plurality of unit cells 12 in their entirety including the collectors and retainer plates of both poles, are fastened together in the stacking direction by means of fastening bolts passed therethrough at the four corners, and integrally secured to form solid polymer electrolyte fuel cell 10.

In the solid polymer electrolyte fuel cell 10, a fuel gas feed port 40a, a fuel gas discharge port 40b, an oxidant gas feed port 40c, an oxidant gas discharge port 40d, a coolant feed port 40e, and a coolant discharge port 40f, for a total of six ports 40a-40f, are formed in the anode retainer plate 36 and cathode retainer plate 38. These ports 40a-40f connect to the corresponding apertures of the fuel gas, oxidant gas, and coolant inlets and outlets 34a-34f formed communicating with one another in the plurality of stacked unit cells 12. External lines (not shown) are connected to the ports 40a-f so that fuel gas, oxidant gas, and coolant can be supplied to and discharged from the fuel gas, oxidant gas, and coolant inlets and outlets 34a-34f.

The fuel gas, oxidant gas, and coolant supplied to the inlets 34a, 34c, 34e through the feed ports 40a, 40c, 40e flows through the fuel gas flow passage 24 and the oxidant gas flow passage formed in an unit cell 12 described previously, and through the coolant flow passage 28 formed between unit cells 12, 12, and then through the outlets 34b, 34d, 34f, to be discharged through the discharge ports 40b, 40d, 40f.

With this arrangement, as in the known art, in the fuel electrode 16a disposed on the first separator 20 side of the solid polymer electrolyte membrane 14, the supplied fuel gas is ionized through catalyst action to supply electrons, while in the oxidant electrode 16b disposed on the second separator 22 side of the solid polymer electrolyte membrane 14, hydrogen ions transported through the solid polymer electrolyte membrane 14 react with oxidant gas (air) supplied from the outside and electrons fed back via an external electrical circuit, to produce water vapor, thereby functioning overall as a battery that exhibits power generating action.

In order to efficient and consistently exhibit the desired power generating action, it is necessary for fuel gas and oxygen gas to be supplied continuously to the catalyst electrodes 16a, 16b of the unit cells 12, and for coolant to be supplied continuously to the unit cells 12 in order to regulate temperature. Accordingly, a description regarding the flow passage construction forming the feed and discharge flow passages for the fuel gas, oxidant gas, and coolant is provided hereinbelow.

In this embodiment, identical metal separators 42 are employed as the first separator 20 and the second separator 22, as shown in FIGS. 3-6.

In preferred practice the metal separator 42 will be formed of metal material that, in addition to having good conductivity, has effective rigidity and corrosion resistance in oxidizing environments, for example, a stainless steel base material, optionally subjected to a surface treatment or used as a composite material with carbon or the like, to achieve the required characteristics at a high level. In order for the metal separator 42 to have the required rigidity and machining precision, it is formed by means of pressing, using a flat metal plate with generally uniform thickness (e.g. thickness of about 0.1 mm-0.5 mm).

Specifically, in the metal separator 42 are punched equal numbers of through-holes (in this embodiment, three on each side) 44a, 44b, 44c, 44d, 44e, 44f located at the first side edge 30 and the second side edge 32 which are situated on the same side when the unit cell 12 is assembled. The three through-holes 44a, 44e, 44d on the first side edge 30 and the three through-holes 44c, 44f, 44b on the second side edge 32 are formed with mutually symmetrical shape and locations. That is, when the metal separator 42 is inverted front to back about a center axis that is either a horizontal center axis extending on the horizontal through the center in the height direction of the metal separator 42 or a plumb-bob vertical axis extending vertically through the center in the lateral direction, the total of six through-holes 44a-44f will be positioned at the same locations of the side edges on the left and right sides. At the first side edge 30, the through-holes 44a, 44e, 44d are formed in that order from the top, and at the second side edge 32 the through-holes 44c, 44f, 44b are formed in that order from the top.

With this arrangement, even when the two metal separators 42, 42 are superposed inverted front to back, the three through-holes formed in each of the left and right edges will align and communicate with one another in the stacking direction. In this embodiment, the through-holes 44a, 44b, 44c, 44d, 44e, 44f respectively constitute the fuel gas inlet 34a, fuel gas outlet 34b, oxidant gas inlet 34c, oxidant gas outlet 34d, coolant inlet 34e, and coolant outlet 34f.

Figure 3:
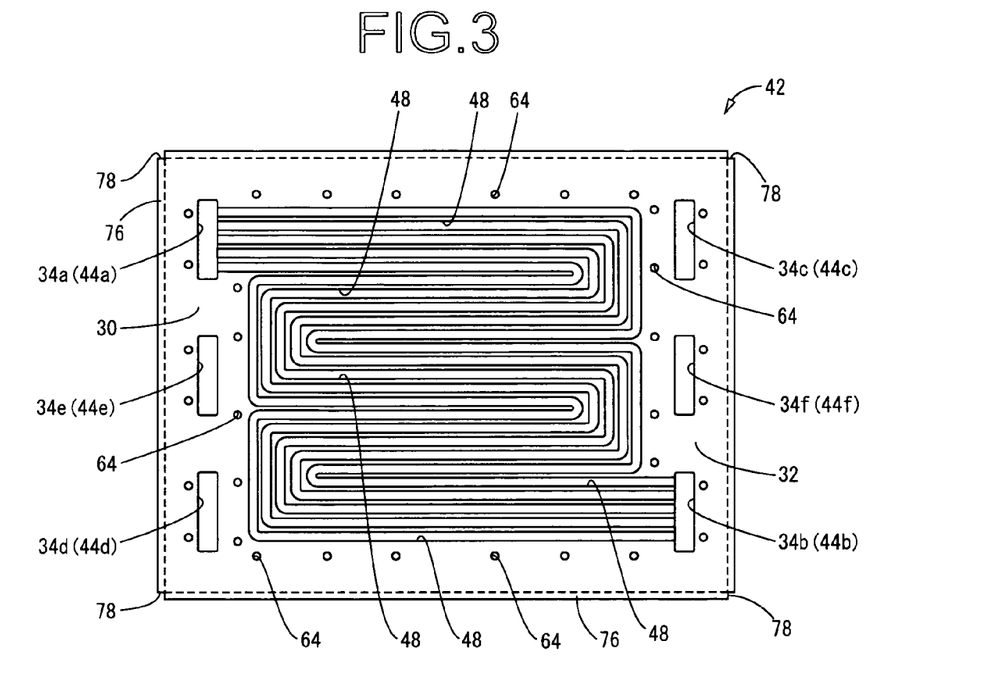
FIG. 3 is a side elevational view showing a primary face of a separator of the solid polymer electrolyte fuel cell of FIG. 1.
Figure 4:
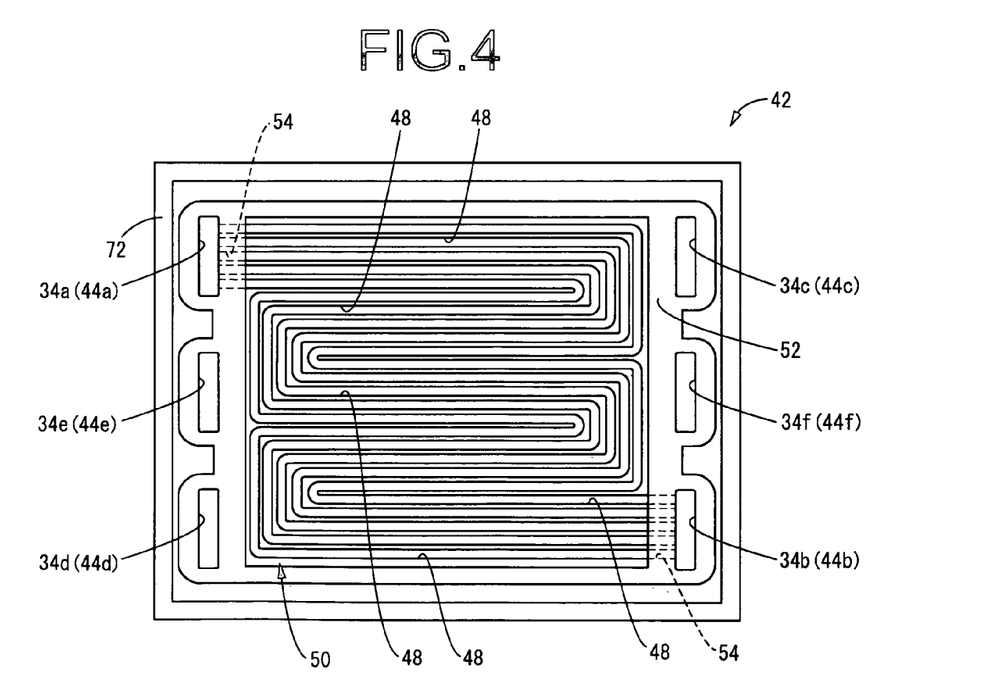
FIG. 4 is a side elevational view of the primary face of the separator provided of FIG. 3 with a seal rubber layer adhered thereto.

In the metal separator 42, as shown in FIG. 3 and FIG. 4, on the primary face thereof superposed against the fuel electrode 16a, there is formed a gas flow passage recess 48 that takes a sinuous path first extending in the horizontal direction from the proximity of the fuel gas inlet 34a formed at the upper left of the first side edge 30 and towards the second side edge 32, inflecting vertically downward in proximity to the second side edge 32 and extending slightly downward, making a U-turn and extending in the horizontal direction back towards the first side edge 30, inflecting vertically downward in proximity to the first side edge 30 and extending slightly downward, making another U-turn and again extending in the horizontal direction towards the second side edge 32, until finally reaching the fuel gas outlet 34b formed at the bottom right of the second side edge 32. This recess 48 connects one through-hole 44a to another through-hole 44b situated opposite in the generally diagonal direction; in this embodiment in particular, a plurality of recesses (five in this embodiment) are formed so as to extend parallel to one another. In preferred practice, linear segments of the recess 48 extending in the horizontal direction will be formed situated at generally equidistant intervals in the vertical direction of the primary face 46.

In this embodiment in particular, the recess 48 has a cross section of generally isosceles trapezoidal shape gradually constricting in width towards the bottom. In preferred practice, the recess 48 will have width of from 1.0 mm to 2.0 mm at the mouth, and from 0.5 mm to 1.5 mm at the bottom, and depth of from 0.3 mm to 1.2 mm. More preferably, it will have width of 1.6 mm at the mouth, width of 1.0 mm at the bottom, and depth of 0.7 mm. In a recess 48 composed of multiple grooves, the interval between neighboring recesses 48 will preferably be from 0.2 mm to 1.2 mm at the mouth, and more preferably 0.7 mm.

Figure 5:
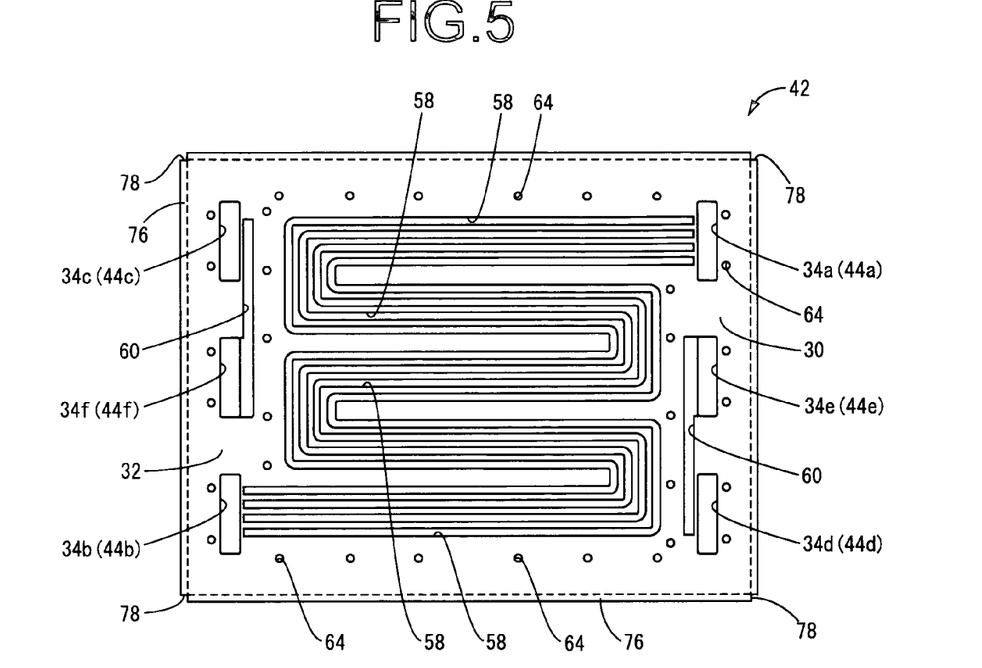
FIG. 5 is a side elevational view of a secondary face of the separator of FIG. 3.

On the primary face of the metal separator 42, the area formed by portions of the recess 48 excepting those portions connecting with the through holes 44a-44d constitutes a gas diffusion zone 50 for stacking against the membrane/electrode assembly 18. As shown in FIG. 5, around the perimeter of the gas diffusion zone 50, the primary face 46 of the metal separator 42 is covered by a primary face seal rubber layer 52 disposed surrounding the gas diffusion zone 50. In this embodiment, the vulcanization molded primary face seal rubber layer 52 is bonded to the primary face 46 of the metal separator 42 over the entire face thereof by means of vulcanization bonding, and adheres fluid-tightly to the metal separator 42. In the assembled state, the primary face seal rubber layers 52 formed covering the primary faces 46 of the first and second separators 20, 22 are placed in pressure contact with one another, thereby providing a fluid-tight seal to the gas diffusion zone 50. Additionally, the inside peripheral face of the primary face seal rubber layer 52 abuts against the outer peripheral face of the fuel electrode 16a or the oxidant electrode 16b, thereby positioning the membrane/electrode assembly 18 superposed to the metal separator 42 on the primary face 46 thereof. In this embodiment in particular, the inside peripheral face of the primary face seal rubber layer 52 is a sloping face, and the inside periphery of the primary face seal rubber layer 52 spreads out gradually moving away from the primary face 46 of the metal separator 42.

Additionally, on the primary face 46 of the metal separator 42, in portions of the recess 48 formed outside of the gas diffusion zone 50, i.e. connecting portions 54 serving as connecting recesses that are the portions connecting with the through holes 44a, 44b, 44c, 44d, the primary face seal rubber layer 52 extends thereover in a bridge configuration to as to cover the openings thereof. In other words, connecting portions 54 which are the connecting portions of the recesses 48 to the through-holes 44a-44d have a generally tunnel structure, by means of the openings of the recesses 48 being covered by the primary face seal rubber layer 52.

Figure 6:
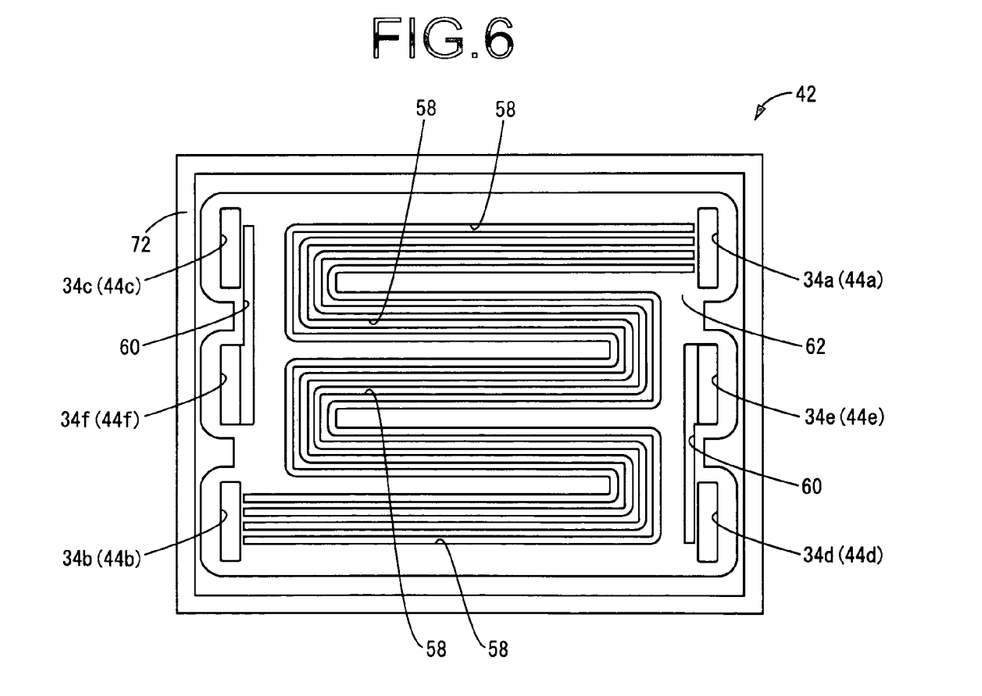
FIG. 6 is a side elevational view of the secondary face of the separator of FIG. 5 provided with a seal rubber layer adhered thereto.

On the secondary face of the metal separator 42 on the opposite side thereof from the primary face onto which the recess 48 opens, there is formed as recessed passage 58 serving as a coolant flow passage forming portion, as shown in FIGS. 5 and 6. The recessed passage 58 is formed on the secondary face 56 between the plurality of recesses 48 formed on the primary face 46, and extends from the proximity of the fuel gas inlet 34a to the proximity of the fuel gas outlet 34b. That is, the land portions between the recesses 48 on the primary face 46 are utilized as the recessed passage 58 on the secondary face 56 on the opposite side, and extend along the recesses 48 to just short of the oxidant gas inlet 34c and the oxidant gas outlet 34d.

A connecting recess 60 is formed in proximity to the coolant inlet 34e and the coolant outlet 34f. The connecting recess 60 connects at one end thereof to the coolant inlet 34e or the coolant outlet 34f, while the other end extends in proximity to the oxidant gas inlet 34c or the oxidant gas outlet 34d.

As shown in FIG. 6, on the secondary face 56 is formed a secondary face seal rubber layer 62 that covers substantially the entire face except the outer peripheral portion of the metal separator 42 and the bottom of the recess 48. On the inside face of the recessed passage 58, an insulating rubber layer 63 is integrally formed with the secondary face seal rubber layer 62 and covers the inside of the recessed passage 58. By so doing, the inside of the recessed passage 58 is electrically insulated from the outside along its entire lengthwise extension. In this embodiment in particular, the metal separator 42 is perforated by a plurality of connecting holes 64, and a seal rubber layer 66 is formed by means of physically unifying the primary face seal rubber layer 52 and the secondary face seal rubber layer 62 which adhere respectively to the primary face 46 and the secondary face 56 of the metal separator 42. This arrangement makes it possible to improve adhesive strength of the seal rubber layer 66, and to prevent improper filling of rubber material during molding of the thin seal rubber layer 66.

Figure 7:
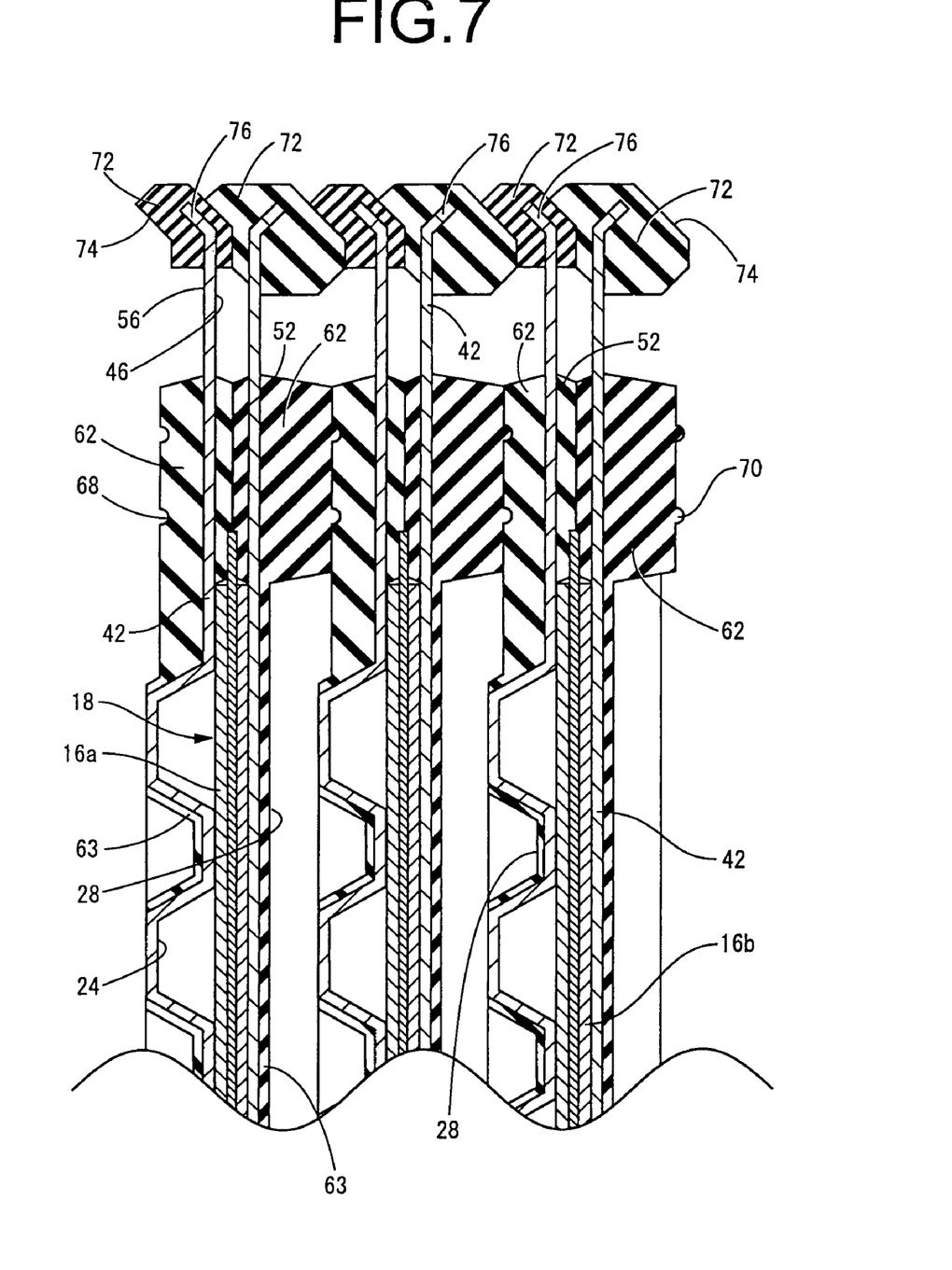
FIG. 7 is a cross sectional view showing unit sells being superposed on one another to form the solid polymer electrolyte fuel cell of FIG. 1.

In this embodiment, as shown in FIG. 7, a mating recess 68 is formed in a part of the secondary face seal rubber layer 62 that covers the metal separator 42 for stacking against the fuel electrode 16a, and a mating projection 70 is formed in part of the secondary face seal rubber layer 62 that covers the metal separator 42 for stacking against the oxidant electrode 16b. By means of mating the mating recess 68 and the mating projection 70, when unit cells 12 are stacked up to produce the cell stack, the unit cells 12 are positioned with respect to one another.

Additionally, as shown in FIG. 7, the outside of the seal rubber layer 66, i.e. the outside peripheral edge of the metal separator 42, is covered by an auxiliary seal rubber 72 extending over substantially the entire periphery. By means of the auxiliary seal rubber 72, sealing is provided between the metal separators 42 in the assembled state, preventing fuel gas, oxidant gas, or coolant from leaking to the outside in the unlikely event of a leak through the seal rubber layer 66. The two faces of the auxiliary seal rubber 72 on the primary face 46 side and the secondary face 56 side of the metal separator 42 are sloping faces that slope towards the primary face 46 from the secondary face 56 side, with the sloping face constituting a guide face 74. The slope angle of the guide face 74 is substantially the same on the primary face 46 side and the secondary face 56 side, and when metal separators 42 are superposed, the guide face 74 on the primary face 46 side and the guide face 74 on the secondary face 56 side are stacked on one another whereby the metal separators 42 may be easily positioned together.

In this embodiment in particular, the guide face 74 is a smooth face, which not only ensures a high level of sealing, but makes possible smooth positioning by means of juxtaposing the guide faces 74. As the means for producing smooth faces on the guide faces 74, it would be conceivable by way of specific examples to employ as the material for the auxiliary seal rubber 72 a self-lubricating rubber that incorporates oil or the like so that lubricant bleeds onto the surface, or alternatively to subject the surface to a laser treatment or coating with low-friction resin.

As shown in FIG. 7, the outside peripheral edge portion of the metal separator 42 covered by the auxiliary seal rubber 72 is sloped towards the secondary face 56 on the side opposite the primary face onto which the recesses 48 open, forming a reinforcing rib 76. The reinforcing rib 76 is formed extending substantially all the way around the edge portion at an angle of approximately 25-65° with respect to the plane of the metal separator 42, making it possible to increase the strength of the metal separator 42 as well to more securely attach the auxiliary seal rubber 72. In this embodiment in particular, notched portions 78 are formed in the four corners of the metal separator 42, which is configured as a generally rectangular plate. By means of the notched portion 78, the reinforcing ribs 76 of adjacent sides are mutually independent, thereby avoiding the occurrence of strain due to bending of the outside edges of the metal separator 42.

Metal separators 42 having the construction described above are superposed against the membrane/electrode assembly 18 from either side. Specifically, the membrane/electrode assembly 18 is constructed by juxtaposing the fuel electrode 16a and the oxidant electrode 16b against the solid polymer electrolyte membrane 14 and unifying them in the manner described previously. The solid polymer electrolyte membrane 14 is of rectangular shape slightly smaller than the metal separator 42, and the fuel electrode 16a and oxidant electrode 16b are of rectangular shape slightly smaller than the solid polymer electrolyte membrane 14. By so doing, the outside peripheral edges of the solid polymer electrolyte membrane 14 project out a predetermined width dimension from the outside peripheral edges of the fuel electrode 16a and oxidant electrode 16b, about the entire periphery. The projecting outside peripheral edges of the solid polymer electrolyte membrane 14 are then sandwiched between the first and second separators 20, 22, and the outside peripheral edges of the solid polymer electrolyte membrane 14 are held clamped about the entire periphery by the primary face seal rubber layers 52 which function as gaskets. By means of the pressure contact against the primary face seal rubber layers 52, a fluidtight seal is provided to the gas diffusion zones on the fuel electrode 16a side and the oxidant electrode 16b side with the membrane/electrode assembly 18 therebetween. In this embodiment in particular, the thickness dimension of the primary face seal rubber layer 52 on the first separator 20 is greater than the thickness dimension of the fuel electrode 16a, and the thickness dimension of the primary face seal rubber layer 52 on the second separator 22 is greater than the thickness dimension of the oxidant electrode 16b. As a specific example, in preferred practice, the thickness dimension of the fuel electrode 16a and the oxidant electrode 16b will be 0.25 mm, and the thickness of each of the primary face seal rubber layers 52 on the separators 20, 22 will be 0.275 mm. Also in preferred practice, the sum of the thickness dimensions of the primary face seal rubber layers 52 on the separators 20, 22 will be the same as or slightly greater than the total thickness of the membrane/electrode assembly 18, i.e. the sum of the thickness dimension of the solid polymer electrolyte membrane 14 and the thickness dimensions of the two fuel/oxidant electrodes 16a, 16b. Preferably, for example, the sum of the thickness dimensions of the primary face seal rubber layers 52 will be 0.55 mm, the thickness dimension of the fuel electrode 16a and the oxidant electrode 16b will be 0.25, and the thickness dimension of the solid polymer electrolyte membrane 14 will be 0.05 mm.

Figure 8:
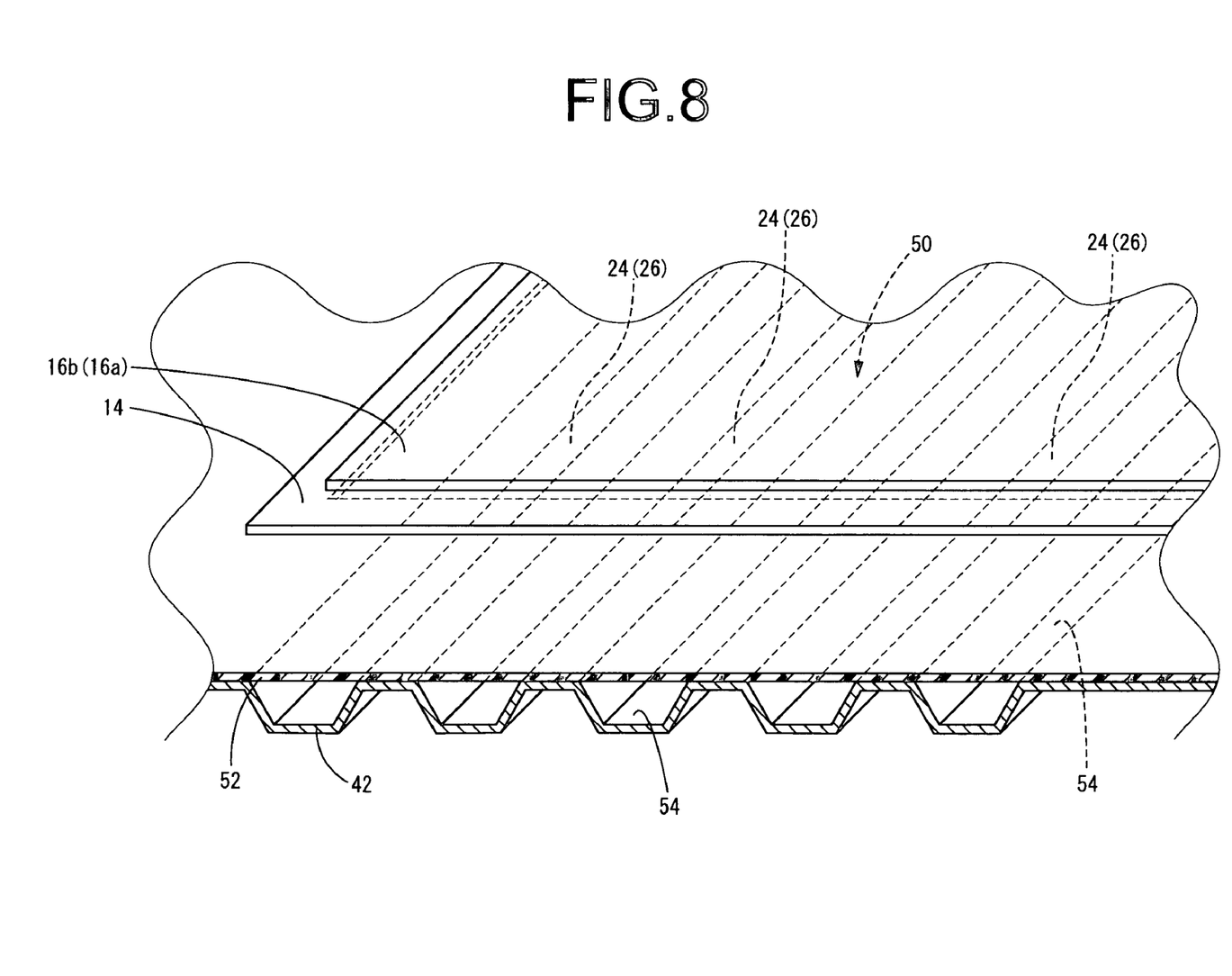
FIG. 8 is a fragmentary enlarged view of the separator of FIG. 4.

At the openings of the connecting portions 54, the primary face seal rubber layers 52 are not sufficiently clamped between the first and second separators 20, 22 due to the presence of connecting portions 54, and accordingly the solid polymer electrolyte membrane 14, which is intended to be held clamped between the primary face seal rubber layers 52, is not sufficiently clamped either. As a result, there is a risk that the extremely thin solid polymer electrolyte membrane 14 may sag into the connecting portions 54 at the openings of the connecting portions 54. Accordingly there is a danger that a gas leak may occur due to fuel gas/oxidant gas intended to be supplied from the fuel gas inlet 34a/oxidant gas inlet 34c to the fuel gas flow passage 24/oxidant gas flow passage 26 via the connecting portions 54 being drawn through the sag and into the gas diffusion zone or the fuel gas flow passage 24/oxidant gas flow passage 26 on the opposite side of the membrane/electrode assembly 18. Accordingly, in this embodiment in particular, as shown in FIG. 8, the primary face seal rubber layer 52 is disposed bridging over the openings of the connecting portions 54. With this arrangement, sagging of the solid polymer electrolyte membrane 14 can be prevented, and gas leaks of the sort described above can be prevented.

The metal separators 42 are superposed at their primary faces 46, 46 against the membrane/electrode assembly 18. Specifically, the first and second separators 20, 22 used as the two metal separators for stacking against either side of the membrane/electrode assembly 18 are assembled flipped front to back with respect to one another. That is, the first separator 20 is superposed against the fuel electrode 16a with the fuel gas inlet 34a formed at upper left and the fuel gas outlet 34b formed at lower right connected by means of a recess 48. On the other hand, flipping the first separator 20 front to back allows it to be used as the second separator 22 superposed against the oxidant electrode 16b, with the oxidant gas inlet 34c formed at upper right and the oxidant gas outlet 34d formed at lower left connected by means of a recess 48.

In the unit cell 12 produced by juxtaposing the first separator 20 and the second separator 22 against the membrane/electrode assembly 18 from both sides, the opening of the recess 48 which opens onto the primary face 46 of the first separator 20 superposed against the fuel electrode 16a is covered by the fuel electrode 16a, thereby forming a fuel gas flow passage 24 between the fuel electrode 16a and the primary face 46 of the first separator 20. On the other hand, the opening of the recess 48 which opens onto the primary face 46 of the second separator 22 superposed against the oxidant electrode 16b is covered by the oxidant electrode 16b, thereby forming the oxidant gas flow passage 26 between the oxidant electrode 16b and the primary face 46 of the second separator 22. By means of sealing with the solid polymer electrolyte membrane 14 held clamped between the primary face seal rubber layers 52, 52 formed covering the first and second separators 20, 22 in the manner described above, gas leakage past the membrane/electrode assembly 18 between the fuel gas flow passage 24 and the oxidant gas flow passage 26 to either side of the membrane/electrode assembly 18 is prevented.

Figure 9:
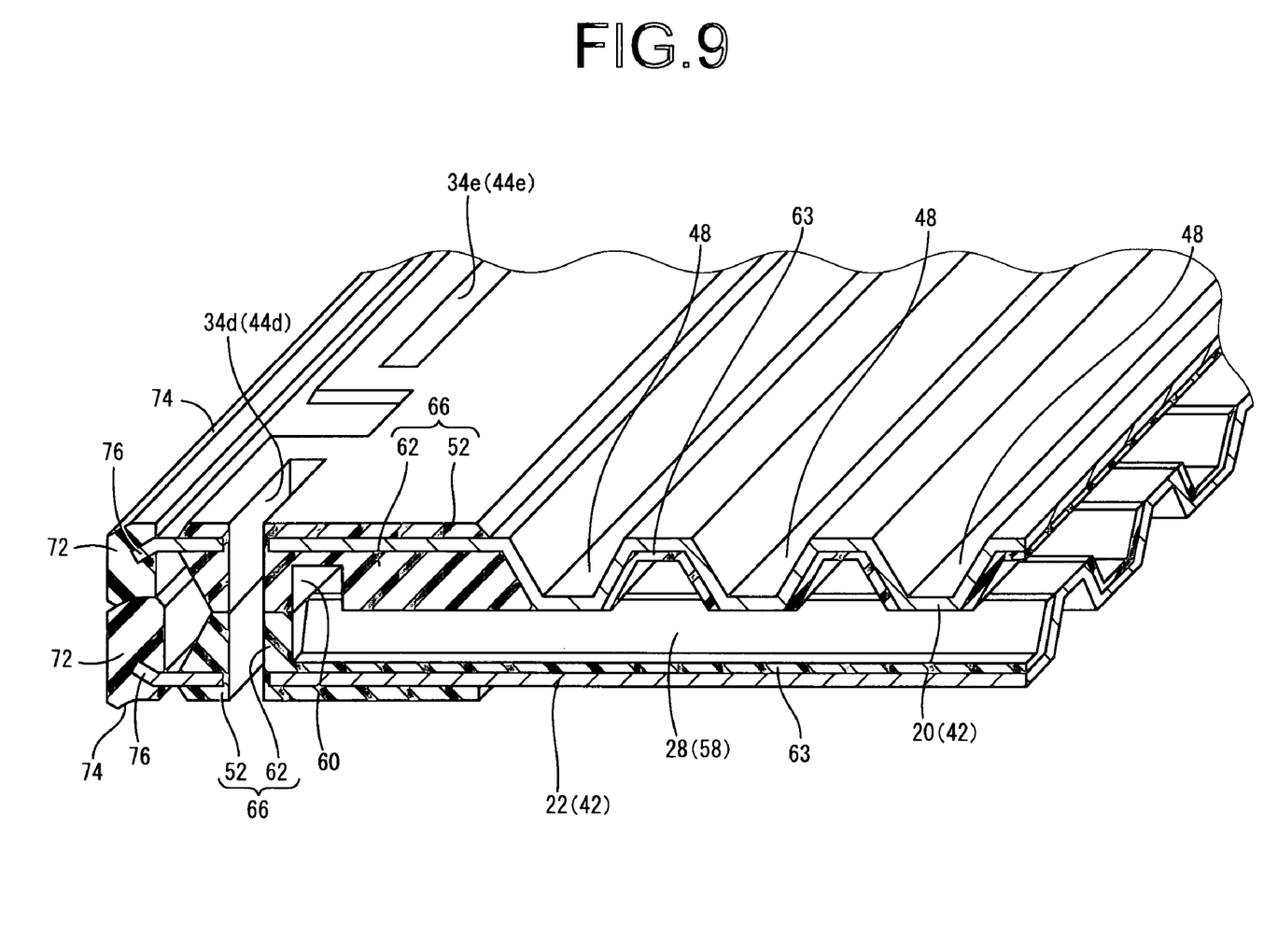
FIG. 9 is an enlarged part cross sectional perspective view showing the secondary face sides of the separators of FIGS. 4 and 6 being superposed together on each other.

Additionally, by stacking together a number of such unit cells 12 with the secondary faces 56 of the metal separators 42 superposed against one another, the opening of the recessed passage 58 formed in the secondary face 56 of a metal separator 42 is covered by another metal separator 42, forming a coolant flow passage 28 between the secondary faces 56 of the metal separators 42. Specifically, as shown in FIG. 9, in recessed passages 58, 58 formed in the secondary faces 56 of metal separators 42 superposed against one another, in some portions the coolant flow passage 28 is formed by the recessed passages 58, 58 superposed with one another, while in other portions the coolant flow passage 28 is formed by the opening of the recessed passage 58 in one metal separator 42 being covered by the bottom of the recess 48 of the other membrane/electrode assembly 42.

Additionally, part of the connecting recess 60 formed in one of the metal separators 42 is superposed with the end of the recessed passage 58 formed in another metal separator 42, and connects with it in the stacking direction. By means of this, with the secondary faces 56 of the metal separators 42 superposed, the two ends of the coolant flow passage 28 formed in one of the metal separators 42 are placed in communication respectively with the coolant inlet 34e and the coolant outlet 34f via the connecting recess 60 formed in the one metal separator 42, whereby coolant supplied from the coolant inlet 34e flows through the coolant flow passage 28 and is discharged from the coolant outlet 34f.

The coolant flow passage 28 is covered over the entire lengthwise extension of the flow passage inner face by the insulating rubber layer 63, but at the bottom of the recess 48 is not covered by the secondary face seal rubber layer 62, so that there is electrical continuity between the first separator 20 and the second separator 22 in portions where the bottoms of recesses 48 are placed in direct abutment. Thus, there is electrical continuity among unit cells 12 whereby the total voltage produced by the unit cells 12 can be drawn out via the anode collector and the cathode collector, while the coolant flow passage 28 is electrically insulated so that dissipation into the coolant of the power generated by the unit cells 12 is prevented.

With the separator for the solid polymer electrolyte fuel cell of construction according to this embodiment, each of the first separator 20 and the second separator 22 has a reinforcing rib at its outer peripheral portion, thereby enhancing rigidity of the first and second separators 20, 22. Moreover, the reinforcing rib is integrally formed by bending the outer peripheral portion of each separator toward its secondary face 56 side where a relatively large thickness dimension is needed to form the gas passage (16a, 16b) and the coolant the first and second separators 20, 22 of the solid polymer electrolyte fuel cell the gas flow passages (24, 26) and the coolant flow passage 28 in between the first and second separators 20, 22. This makes it possible to obtain a relatively large projecting length of the reinforcing rib 76, thus ensuring high rigidity of the first and second separators 20, 22 with high efficiency.

In this embodiment, metal separators 42 are used as the first and second separators 20, 22. With this arrangement, it is possible to make the first and second separators 20, 22 sufficiently thin, while assuring adequate strength. Thus, it is possible to reduce the thickness of the unit cells 12, and to achieve more compact size of the cell stack composed of the unit cells, and thus of the solid polymer electrolyte fuel cell 10. Additionally, by means of forming the reinforcing rib around the entire outer peripheral edge of the metal separator 42, the strength of the metal separator 42 can be increased further, and a thinner metal separator 42 can be achieved more advantageously.

Further, by forming the first and second separators 20, 22 using metal which has superior conductivity to conductive resins and carbon, a high performance solid polymer electrolyte fuel cell 10 can be realized easily. Also, since metal has a much higher heat resistance temperature than resins or carbon, even if place d in a solid polymer electrolyte fuel cell 10 that produces an exothermic reaction, it is possible to avoid problems such as heat induced deformation and shrinkage. Additionally, metal separators 42 are easily reused by being recycled.

Yet further, by forming the first and second separators 20, 22 using the metal separators 42 formed by press-molding, these separators 20, 22 can be formed with high dimensional accuracy and high production efficiency.

In this embodiment, the first and second separators 20, 22 can be formed with identical metal separators 42 by simply flipping front to back, making it possible to reduce the number of parts, thereby achieving readily manufacture and management of the components as well as simplified manufacturing facilities.

In this embodiment in particular, notched portions 78 are formed in the four corners of the metal separator 42, which is configured as a generally rectangular plate. The notched portion 78 makes it possible to avoid substantially completely occurrence of strain at the corners of the metal separator 42 created upon forming the reinforcing rib 76, thereby ensuring improved durability and stable performance and capability of the separators.

In the present embodiment, the seal rubber layer 66 and the auxiliary rubber 72 are respectively formed. This arrangement provides a double sealing mechanism including a sealing of the gas diffusion zone 50 by means of the seal rubber layer 66 as well as a sealing of the inside zone from the outside space by means of the auxiliary rubber 72, resulting in a high level of fluid-tight sealing of the fuel cell. Moreover, since the seal rubber layer 66 and the auxiliary rubber 72 can be formed separately from each other, allowed is a high degree of freedom in selecting suitable rubber materials for the respective members, in order to meet the required characteristics. Thus, the seal rubber layer 66 and the auxiliary rubber 72 can be provided while highly realizing their required characteristics.

By forming the faces of the auxiliary rubber 72 of a plurality of separators mutually superposed one another as mutually corresponding sloping faces, i.e., the guide faces 74, mutually adjacent separators can be readily positioned relative to one another through the guide faces 74 of the auxiliary rubber 72. Moreover, since the guide faces 74 are formed as smooth faces, further assuring separator positioning performance of the guide faces 74 of the auxiliary rubbers 72 with further enhanced efficiency.

The cell for the solid polymer electrolyte fuel cell of construction according to the present embodiment is able to make the cell for the solid polymer electrolyte fuel cell compact in size while assuring high rigidity and a high level of electrical performance.

Figure 10:
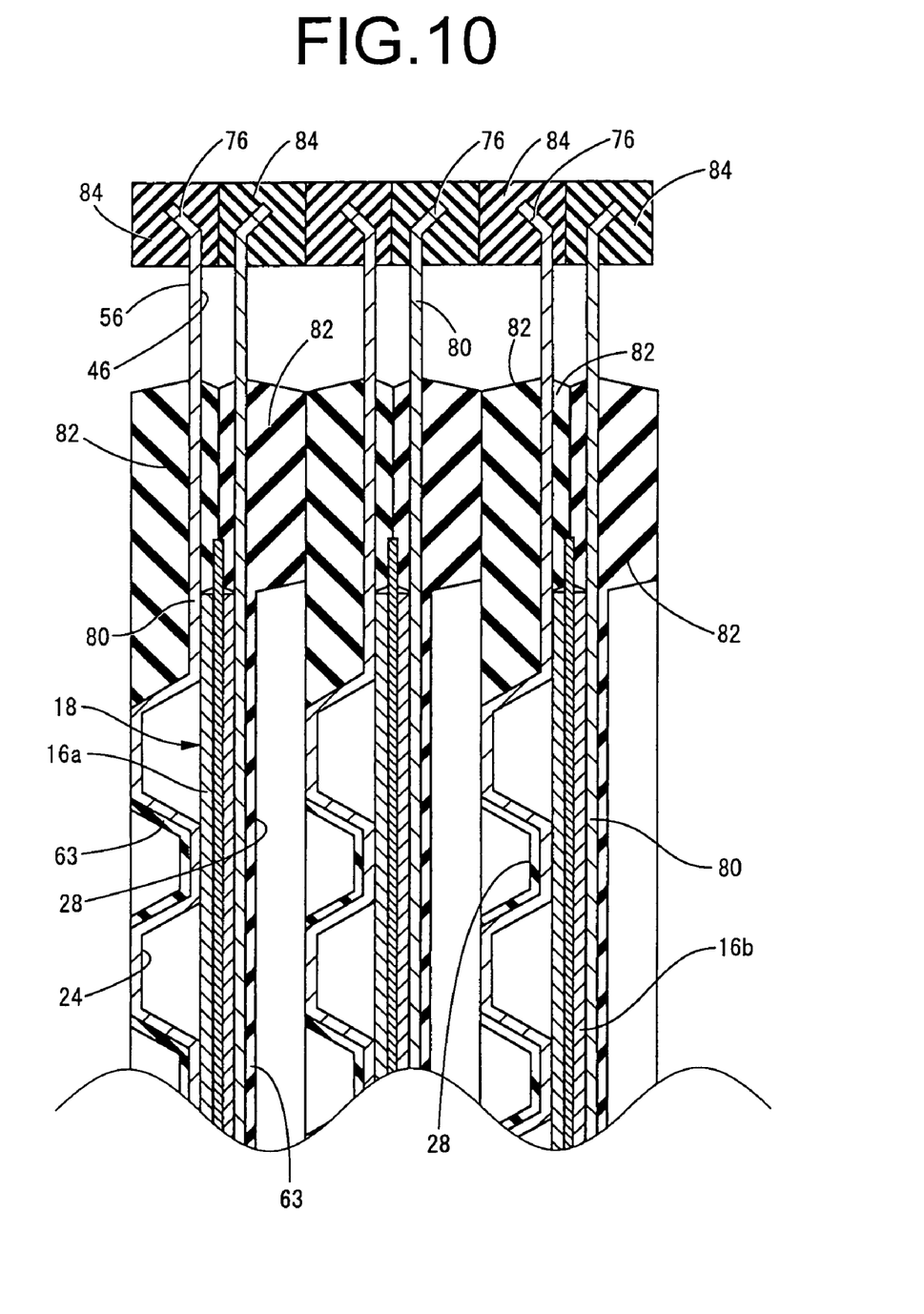
FIG. 10 is a cross sectional view of unit cells each including a separator according to a second embodiment of the invention, where the unit cells are superposed together.

Referring next to FIG. 10, a metal separator 80 for a solid polymer electrolyte fuel cell as a second embodiment of the invention is shown in the assembled state. In the following description, components are parts substantially identical to those of the first embodiment are assigned the same symbols as the first embodiment in the drawing, and are not described in any detail.

Specifically, in the second embodiment of the invention, the seal rubber layer 82 and auxiliary seal rubber 82 formed on the plurality of metal separators 80 have substantially identical shape. Specifically, for example, the mating recess 68 and the mating projection 70 provided to the seal rubber layer 82 in the first embodiment are not provided to the seal rubber layer 82 in the second embodiment, and the auxiliary seal rubber 84 has a generally square shape without sloping faces.

In the metal separator 80 for the solid polymer electrolyte fuel cell of construction according to the second embodiment, even if the metal separator 80 is covered with a seal rubber layer 82 and an auxiliary seal rubber 84, by flipping it front to back, it is possible to use either as the first separator 20 or the second separator 22. Thus, it is possible to more advantageously achieve standardization of parts for the first separator 20 and the second separator 22, so that more efficient operations during assembly may be achieved.

By employing the metal separator 80 for the solid polymer electrolyte fuel cell of this embodiment, since the shape is identical when flipped front to back, it is possible for the procedure of stacking unit cells to make a solid polymer electrolyte fuel cell to be carried out more efficiently.

While the presently preferred embodiments of this invention have been described in detail, for illustrative purpose only, it is to be understood that the present invention is not limited to the details of the illustrated embodiments.

For instance, the recesses 48 formed in the metal separators 42, 80 will in preferred practice extend in a sinuous configuration as in the preceding examples, but need not necessary have such a configuration.

The cross sectional shape of the recess 48 is not limited in any way to the shape taught in the embodiments. As a specific example, a recess with a rectangular cross section could be employed.

In the preceding embodiments, the coolant flow passage 28 is formed using the peaks and valleys formed by the recesses 48 on the secondary faces 56 of the first and second separators 20, 22, but it is not necessary to use these peaks and valleys to form the coolant flow passage 28. Additionally, it is not necessary for flow passages to extend with substantially unchanging cross section, it being sufficient for the passage to connect the coolant inlet 34e and the coolant outlet 34f on the secondary face so that coolant can flow between them.

The fuel gas inlet 34a oxidant gas inlet 34c connected by the recesses 48, or the coolant inlet 34e and the coolant outlet 34f connected by the coolant flow passage 28, need not be limited to one of each. Specifically, it would be possible to form a plurality of inlets and outlets, in which case a plurality of flow passages would be formed to connect the openings.

While in the preceding embodiments the seal rubber layer 66, 82, and the auxiliary rubber 72, 84 are formed separately from each other, these seal rubber layer 66, 82, the auxiliary rubber 72, 84 may be formed integrally with each other.

In the preceding embodiments, notched portions 78 were provided in the corners of the metal separators 42, 80, but it is not necessary to provide such notched portions. Nor is it necessary to provide the auxiliary rubber 72, 84 covering the reinforcing rib 76. By dispensing with formation of the auxiliary rubber 72, 84, and also dispensing with formation of the mating recess 68 and the mating projection 70 in the secondary face seal rubber layer 62, it is possible to realize the first and second separators 20, 22 as separators of substantially identical shape, whereby handling and assembly procedures may be carried out more efficiently.

What is claimed is:

1. A cell for a solid polymer electrolyte fuel cell, comprising:
    a membrane/electrode assembly including a fuel electrode and an oxidant electrode disposed on either side of a solid polymer electrolyte membrane;
    a first separator superposed against a surface of the oxidant electrode that defines an oxidant gas flow passage; and a second separator superposed against a surface of the fuel electrode that defines a fuel gas flow passage, wherein the first separator and the second separator, each has a primary face, a secondary face, and outer peripheral edges, with the outer peripheral edges having outermost peripheral edges, the first separator and the second separator being composed of rectangular thin metal plates of a same or nearly the same shape, with the outermost peripheral edges of the first separator and the second separator each bending inclined towards the secondary face thereof on an opposite side of the primary face;

the primary face of the second separator is superposed against the membrane/electrode assembly and the primary face of the first separator being superposed against the membrane/electrode assembly to define a reinforcing rib by means of the outer peripheral edges thereof; and the first separator and the second separator each further comprise in a thickness direction perforations having six inlet/outlet holes including a fuel gas inlet hole, a fuel gas outlet hole, an oxidant gas inlet hole, an oxidant gas outlet hole, a coolant inlet hole and a coolant outlet hole, the six inlet/outlet holes being disposed to overlap each other when the first separator and the second separator define the reinforcing rib, each corresponding inlet/outlet hole being the same shape.

2. The cell of claim 1, wherein the first separator on the primary face side includes: the fuel gas inlet hole and the fuel gas outlet hole disposed at opposite locations in a first diagonal direction of the first separator; the oxidant gas inlet hole and the oxidant gas outlet hole disposed at opposite locations in a second diagonal direction of the first separator opposite to the first diagonal direction; and a recess connecting the fuel gas inlet hole and the fuel gas outlet hole situated in the first diagonal direction with a sinuous path shape that defines a fuel gas flow passage;

the second separator on the primary face side includes: the oxidant gas inlet hole and the oxidant gas outlet hole disposed at opposite locations in a first diagonal direction of the second separator; and the fuel gas inlet hole and the fuel gas outlet hole disposed at opposite locations in a second diagonal direction of second separator opposite to the first diagonal direction; and a recess connecting the oxidant gas inlet hole and the oxidant gas outlet hole situated in the first diagonal direction with the sinuous path shape that defines an oxidant gas flow passage; and a coolant flow passage connecting the coolant inlet hole and the coolant outlet hole is a recessed passage on the secondary face of the first separator with land portions between the recesses on the primary face so as to extend from a proximity of the fuel gas inlet hole to a proximity of the fuel gas outlet hole with the sinuous path shape, and on the secondary face of the second separator with the land portions between the recesses on the primary face so as to extend from a proximity of the oxidant gas inlet hole to a proximity of the oxidant gas outlet hole with the sinuous path shape.

3. The cell of claim 2, wherein a connecting recess is disposed on the secondary face of the first separator such that the connecting recess connects at one end of the secondary face of the first separator to the coolant inlet hole while an other end of the connecting recess extends in proximity to the oxidant gas inlet hole, and is disposed on the secondary face of the second separator such that the connecting recess connects at one end of the secondary face of the second separator to the coolant outlet hole while the other end of the connecting recess extends in proximity to the oxidant gas outlet hole, and the secondary face of the first separator and the secondary face of the second separator superposed against one another to form the coolant flow passage by means of the recessed passages such that two ends of the coolant flow passage formed on the first separator are placed in communication respectively with the coolant inlet hole and the coolant outlet hole via the connecting recess of the second separator, while two ends of the coolant flow passage formed on the second separator are placed in communication respectively with the coolant inlet hole and the coolant outlet hole via the connecting recess of the first separator.

4. The cell of claim 1, wherein a primary face seal rubber layer is disposed on the primary face of each of the first separator and the second separator, so as to surround a perimeter of an area defining the fuel gas flow passage or the oxidant gas flow passage when superposed against the fuel electrode or oxidant electrode of the membrane/electrode assembly, and perimeters of the fuel gas inlet/outlet holes and the oxidant gas inlet/outlet holes for supplying and exhausting fuel gas and oxidant gas to and from the fuel gas flow passage and the oxidant gas flow passage.

5. The cell of claim 1, wherein the outermost peripheral edge portions of the first separator and the second separator where the reinforcing rib is defined to have auxiliary seal rubbers attached, the auxiliary seal rubbers abutting one another between the superposed first separator and second separator so as to seal off from an outside space a zone between opposed faces of the first and second separators where the membrane/electrode assembly is disposed.

6. The cell of claim 5, wherein the auxiliary seal rubber formed at the outermost peripheral edge portion of one of the first separator and the second separator is superimposed against the auxiliary seal rubber of another separator disposed in superposition therewith at corresponding sloping faces thereof so that by means of superposition of these sloping faces against one another, the mutually superposed first separator and second separator, by means of the auxiliary seal rubber, can be aligned with respect to one another in a superposed plane direction orthogonal to a superposed direction.

7. The cell of claim 1, wherein the sloping face of the auxiliary seal rubber is a lubricated face with improved lubricating function.

8. The cell of claim 1, wherein each of the first separator and the second separator has generally rectangular cutout portions formed in four corners thereof, with the reinforcing rib being substantially divided from one another and formed independently by means of the cutout portions at the four corners.

9. The cell of claim 1, wherein outer peripheral sides of the oxidant gas flow passage and the fuel gas flow passage of the first separator and the second separator each extending straight along the membrane/electrode assembly.

* * * * *